United States Patent
Libby

(10) Patent No.: US 7,136,617 B2
(45) Date of Patent: Nov. 14, 2006

(54) COMPUTER ASSISTED GAME FOR TEACHING COOPERATIVE RESOURCE ALLOCATION AND MULTI-PARTY NEGOTIATION SKILLS

(75) Inventor: Vibeke Libby, Woodside, CA (US)

(73) Assignee: Agilemath, Inc., Woodside, CA (US)

( * ) Notice: Subject to any disclaimer, the term of this patent is extended or adjusted under 35 U.S.C. 154(b) by 693 days.

(21) Appl. No.: 10/361,197

(22) Filed: Feb. 7, 2003

(65) Prior Publication Data

US 2004/0157194 A1  Aug. 12, 2004

(51) Int. Cl.
*G09B 3/00* (2006.01)

(52) U.S. Cl. ............... 434/350; 434/107; 434/128; 434/362

(58) Field of Classification Search ............... 434/107, 434/118, 128, 219, 350, 362, 365; 463/1, 463/2, 16, 20, 30, 40, 42, 33; 473/416; 705/10, 705/30; 700/91; 703/6; 706/16, 10; 707/100; 709/205, 223; 725/133; 726/5
See application file for complete search history.

(56) References Cited

U.S. PATENT DOCUMENTS

| | | | | |
|---|---|---|---|---|
| 5,697,844 A * | 12/1997 | Von Kohorn | ................. | 463/40 |
| 5,779,549 A * | 7/1998 | Walker et al. | ................. | 463/42 |
| 5,949,679 A * | 9/1999 | Born et al. | .................... | 700/91 |
| 6,042,477 A * | 3/2000 | Addink | ......................... | 463/42 |
| 6,106,399 A * | 8/2000 | Baker et al. | ................... | 463/42 |
| 6,286,005 B1 * | 9/2001 | Cannon | ...................... | 707/100 |
| 6,341,353 B1 * | 1/2002 | Herman et al. | ................. | 726/5 |
| 6,345,239 B1 * | 2/2002 | Bowman-Amuah | ............ | 703/6 |
| 6,473,794 B1 * | 10/2002 | Guheen et al. | ............. | 709/223 |
| 6,496,812 B1 * | 12/2002 | Campaigne et al. | .......... | 706/16 |
| 6,558,258 B1 * | 5/2003 | Rupert et al. | .................. | 463/33 |
| 6,629,081 B1 * | 9/2003 | Cornelius et al. | ............. | 705/30 |
| 6,659,861 B1 * | 12/2003 | Faris et al. | ..................... | 463/1 |
| 6,701,345 B1 * | 3/2004 | Carley et al. | ................ | 709/205 |
| 6,712,699 B1 * | 3/2004 | Walker et al. | ................ | 463/30 |
| 6,761,633 B1 * | 7/2004 | Riendeau et al. | ............. | 463/16 |
| 2001/0042056 A1 * | 11/2001 | Ferguson | ...................... | 706/10 |
| 2003/0018513 A1 * | 1/2003 | Hoffman et al. | ............... | 705/10 |
| 2003/0064807 A1 * | 4/2003 | Walker et al. | ................ | 463/42 |
| 2003/0073518 A1 * | 4/2003 | Marty et al. | .................. | 473/416 |
| 2004/0006566 A1 * | 1/2004 | Taylor et al. | ................ | 707/100 |
| 2004/0077401 A1 * | 4/2004 | Schlottmann | ................ | 463/20 |
| 2004/0143852 A1 * | 7/2004 | Meyers | ........................ | 725/133 |
| 2004/0166914 A1 * | 8/2004 | Ishihata et al. | ................. | 463/2 |

* cited by examiner

*Primary Examiner*—Joe H. Cheng
(74) *Attorney, Agent, or Firm*—Morgan, Lewis & Bockius LLP

(57) ABSTRACT

A multiple player game has objects corresponding to projects to which resources are allocated by the players of the game. The players include a plurality of groups. A resource bank mechanism determines a bank of resources to be made available to each group of players for allocation to the projects controlled by the players the group. A first game mechanism allows each player to make independent resource allocations to a project controlled by that player. A second game mechanism requires each group of players to make joint resource allocation decisions. A third game mechanism requires a plurality of the groups to make team level decisions affecting resource allocations to projects controlled by the groups of players. A scoring mechanism assigns a respective project score to each project of each group, a group score to each group of projects, and a team score to the plurality of projects.

24 Claims, 11 Drawing Sheets

Individual Score Calculator

| Resource Name | Project Proposal | Final Project | Resource Matches |
|---|---|---|---|
|  |  |  |  |
|  |  |  |  |
|  |  |  |  |
|  |  |  |  |
|  |  |  |  |
|  |  |  |  |
|  |  |  |  |
|  |  |  |  |
|  |  |  |  |
| Totals: |  |  |  |

Diff: sum project proposal − sum matches

[ ] = [ ] − [ ]
Diff   proj prop   matches

Look up score in Table below:

| Diff = 0 | Diff = 1 | Diff = 2 | All Other |
|---|---|---|---|
| 10 | 7 | 3 | 1 |

| | |
|---|---|
| DIFF project score component |  |
| Tokens remaining at end of phase 1 |  |
| Unreasonable proposal penalty |  |
| Total project score |  |

FIG. 8A

Individual Score Calculator

| Resource Name | Project Proposal | Final Project | Resource Matches |
|---|---|---|---|
|  |  |  |  |
|  |  | X |  |
|  |  |  |  |
|  | X | X | X |
|  | X | X | X |
|  |  |  |  |
|  | X |  |  |
|  | X |  |  |
|  |  | X |  |
| Totals: | 4 |  | 2 |

Diff: sum project proposal − sum matches

| 2 | = | 4 | − | 2 |
|---|---|---|---|---|
| Diff |  | proj prop |  | matches |

Look up score in Table below:

| Diff = 0 | Diff = 1 | Diff = 2 | All Other |
|---|---|---|---|
| 10 | 7 | 3 | 1 |

| DIFF project score component | 3 |
|---|---|
| Tokens remaining at end of phase 1 | 3 |
| Unreasonable proposal penalty |  |
| Total project score | 6 |

FIG. 8B

Group Score Calculator

| Items left at the end of the game | Number | Multiplier | Product |
|---|---|---|---|
| # of Tokens | | 1 | |
| # of Live Projects | | 3 | |
| Total # of Resources Used | | 1 | |
| Group Score → | | | $\sum =$ |

FIG. 9

Team Score Calculator

| Group ID/# | Score |
|---|---|
| Group 1 | |
| Group 2 | |
| Group 3 | |
| . . . | |
| Group G | |
| Team Score: | $\sum =$ |

FIG. 10

COMPUTER ASSISTED GAME FOR TEACHING COOPERATIVE RESOURCE ALLOCATION AND MULTI-PARTY NEGOTIATION SKILLS

FIELD OF INVENTION

The present invention relates generally to educational games, and in particular to an educational game for teaching adults, such as corporate and governmental agency managers, cooperative resource allocation skills and multi-party negotiation skills.

BACKGROUND OF THE INVENTION

Many types of educational games, including computer games and computer assisted games are, of course, well known. Most educational games are designed to either teach school age children basic or advanced skills associated with elementary and secondary school subjects (e.g., math, reading, and/or writing skills), or to teach users (children or adult) how to play chess, golf, or some other game. Most educational games are designed to be used by only one person at a time.

There are also many "drill and test" computer programs, which are not games, which cover educational material and then test the user's recollection of the facts presented, or test skills associated therewith (e.g., drawing inferences and deductions from presented fact patterns). Drill and test programs are rarely if ever considered to be fun, and are generally designed to be used by only one individual at a time.

There are any number of books and educational courses that teach, or attempt to teach, negotiation techniques between two parties. Some of these books and courses include "exercises" for practicing negotiation techniques, and those exercises may be considered to be two person games or interactions. A goal of the negotiations in such exercises may be to achieve an outcome that improves the joint welfare of both parties.

Another context in which cooperation among competitors, in order to achieve a "greater common good", arises is "game theory." As is well known, however, game theory has virtually nothing to do with games, and everything to do with studying and predicting the interactions between people who are trying to outsmart or outdo each other.

SUMMARY OF THE INVENTION

The present invention provides a new type of game, which teaches skills that require cooperation among multiple (typically more than three) persons who are also competing with each other. Teaching such skills is difficult, even in the best of circumstances. Such skills, in fact, are rarely taught at all, and when they are taught, it is generally in the format of a person lecturing to a group. Such lectures may exhort the audience members to cooperate with each other, even if their individual interests are at least partially adverse.

In accordance with the present invention, a multiple player game has objects corresponding to projects to which resources are allocated by the players during the course of the game. The players include a plurality of groups, each of which has a plurality of players. A resource bank mechanism determines a bank of resources to be made available to each group of players for allocation to the projects controlled by the players in the group. A first game mechanism allows each player to make independent resource allocations to a project controlled by that player. A second game mechanism requires each group of players to make joint resource allocation decisions. A third game mechanism requires a plurality of the groups to make team level decisions affecting resource allocations to projects controlled by the groups of players. A scoring mechanism assigns a respective project score to each project of each group, a group score to each group of projects, and a team score to the plurality of projects.

BRIEF DESCRIPTION OF DRAWINGS

Additional objects and features of the invention will be more readily apparent from the following detailed description and appended claims when taken in conjunction with the drawings, in which:

FIG. 8A depicts a score card or score calculator for computing an individual score for an individual player, and FIG. 8B depicts a "filled-in" example of the score card of FIG. 8A.

FIG. 9 depicts a group score card or group score calculator for computing a group score for a group of players.

FIG. 10 depicts a team score card or team score calculator for computing a team score for a team having two or more groups of players.

Like reference numerals refer to corresponding parts throughout the several views of the drawings.

DETAILED DESCRIPTION OF EMBODIMENTS

Figure 1:
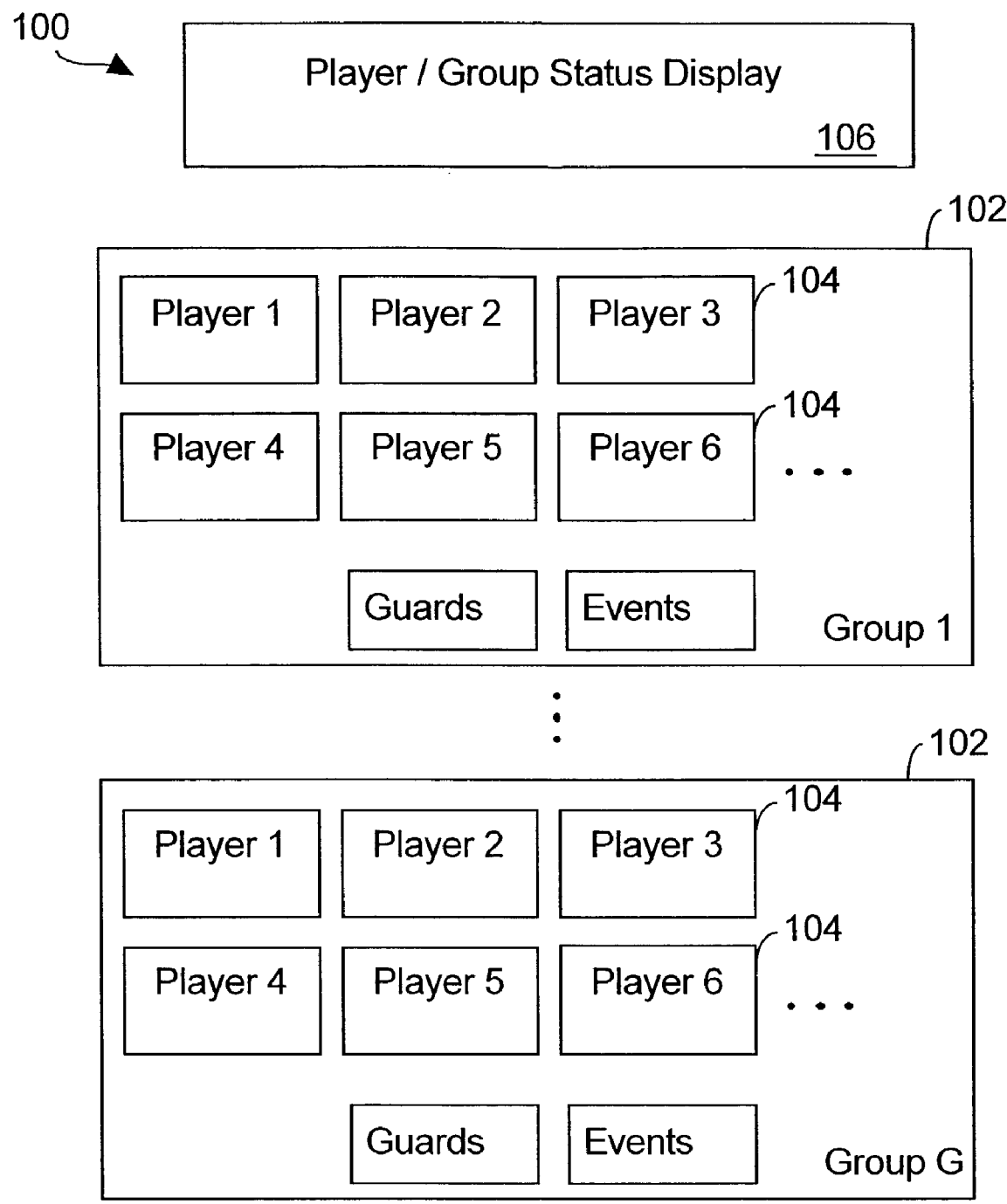
FIG. 1 is a conceptual block diagram of a game having multiple groups of players.

A specific embodiment of the present invention will be described next, along with explanations of a number of alternate embodiments. Solely for pedagogical purposes, these embodiments are described with respect to a specific game having a specific set of projects that are controlled by the players of the game. However, it should be understood that the specific projects, the specific types of resources to be allocated, the number of players per group, and the other details of the game are only examples. These and other details of the game may be changed without changing the underlying methodologies.

Abbreviated Explanation of an Embodiment of the Game

In order to make the following detailed explanation easier to understand, a very brief explanation of an embodiment of the game will be provided. A more complete explanation is provided in conjunction with the flow charts of FIGS. 5A, 5B, 6 and 7. In a typical game, several groups of six players play the game. Each player is assigned to a project, and each group has an identical set of six projects. The number of players and projects stated here is only exemplary, and may be different in other implementations. A set of R different types of resources are available for allocation to the projects controlled by the players, and each player makes an initial selection of resources to allocate to his/her project, without knowing how many of each resource type is available from a "resource bank". In one embodiment, no more than one instance of each resource can be allocated to any one project. As a result, a project that already has a particular resource is not eligible to receive any more instances of that resource.

In a first phase of the game, each player determines which resources to be allocated to his/her project are required resource (i.e., needed, or "must have" resources), and which are just desirable resources. Every group has a different (but equally stocked) resource bank. Also, every player is initially given a same number of tokens.

A computer that runs the game determines which resources are overdrawn and indicates which projects are in conflict with the resource bank. The players having projects in conflict with the resource bank are required to reduce the number of resources they are requesting. For each round of resource reductions, each player having a conflict with the resource bank loses a token. If a player runs of out of tokens, his/her project is declared to be dead, unless his group decides to save the project by donating tokens to it.

In a second phase of the game, an additional resource is given to each group, which must then decide, as a group, which project to give the added resource. The group is also required to make other joint decisions in preparation for the third phase of the game. In particular, each group selects guards, which protect against the adverse consequences of potential events.

In a third phase of the game each group is subjected to events that cause them to either lose resources, or to expend tokens to protect those resources. In this phase the groups are allowed to make trades with each other, in particular to trade the previously selected "guards", and to thereby improve the overall welfare or score of the team.

In a preferred embodiment, the quantity of resources in the Resource Bank for each group is not revealed to the players during the course of the game. Rather, the players must infer the likely levels of resources in the resource bank based on the flow of the game. However, for novice players who have not previously played the game, a "warm up" version of the game is preferably played at first. In the "warm up" version, the quantity of each type of resource in the Resource Bank is displayed at the end of phase 1 of the game, after the players have made their initial resource selections. In addition, scoring and penalties are preferably not used in the warm up version of the game. Playing the warm up version of the game enables the players to better understand the role of the hidden Resource Bank, as well as other features of the game, prior to playing the normal version of the game.

Players, Projects, Groups, Game Objects

As shown in FIG. 1, in an embodiment of the game 100, there are multiple groups 102 of players 104. Together, all the groups, 1 to G, form a team. A goal of the game is to maximize the scores of the team, the groups, and the individual players. During the course of the game the players and groups make choices or decisions which cause the status of the projects being controlled by the players to change. Status information concerning the game and the projects are preferably displayed on a computer controlled display 106.

While the number of players per group is preferably six in one embodiment, the number of players per group may be different in other embodiments, and will preferably be between two and ten, and most preferably between four and eight. To make comparison of the performance of the groups most meaningful, it is best for all groups 102 to have the same number of players. However, it is possible in some embodiments to have different numbers of players in the groups, although this would require scaling the resources assigned to the resource bank for each of the smaller or larger groups (see discussion of the resource bank below) and possibly other adjustments as well.

Figure 2:
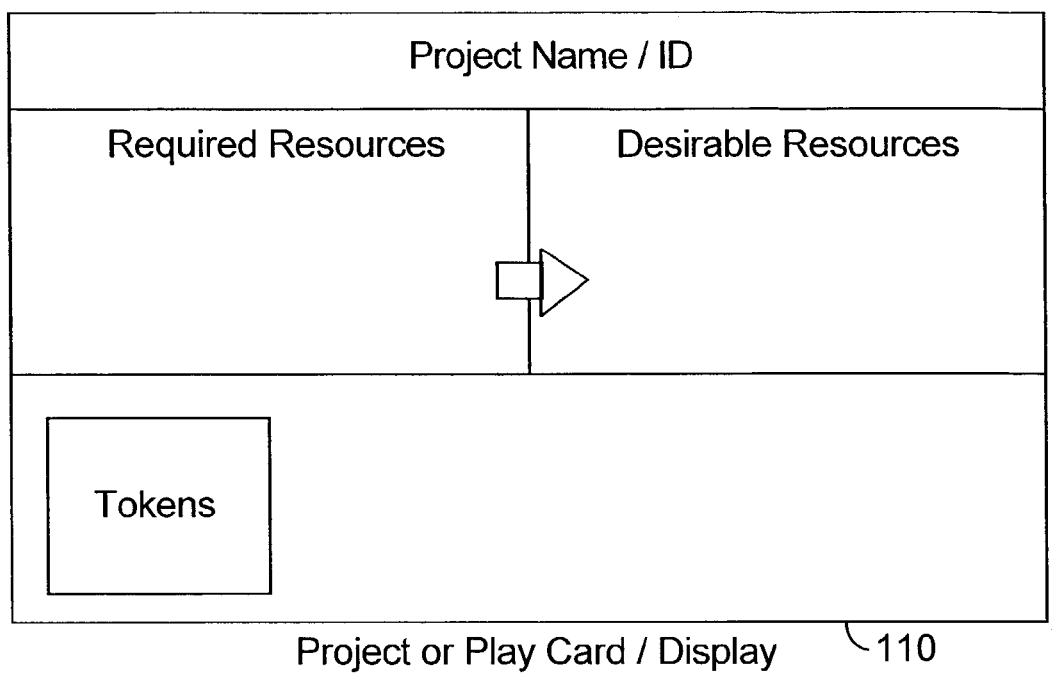
FIG. 2 depicts game objects, including project objects, group objects, resource objects, and the like, used in an embodiment of the present invention.
Figure 2:
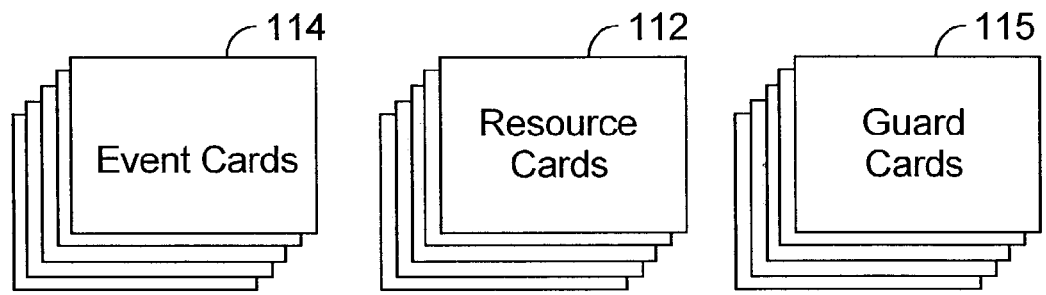
Figure 2:
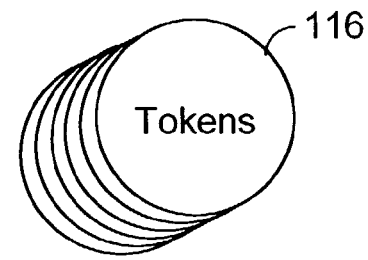
Figure 2:
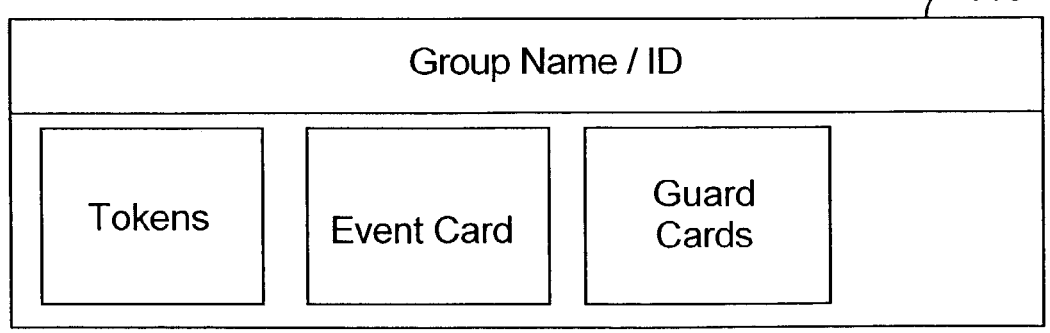

FIG. 2 shows some of the game objects or pieces used in an embodiment. The game objects include a project object 110 for each player participating in the game. Each project object may be implemented as cardboard or plastic card on which a project pattern is printed or attached, or may be implemented using a computer controlled display tablet or other computer based display device. The project object 110 preferably includes an area for placing or displaying needed resources, a second area for placing or displaying desirable resources (represented by resource cards 112, or by images or resource cards in implementations where the project object 110 is computer implemented), and optionally a third area for placing or displaying other game objects, such as tokens 116 (e.g., cards or images representing tokens), event cards 114 (or images representing event cards) or guard cards 115 (or images representing guard cards). In implementations that use computer implemented project objects 110, the various game cards may be implemented as images that appear on the computer controlled display of the project object.

FIG. 2 also shows a group object 118, which may be implemented as cardboard or plastic card on which a group pattern is printed or attached, or may be implemented using a computer controlled display tablet or other computer based display device. The group object 119 preferably includes an area for placing game pieces, such as tokens 116, guard cards 115 and event cards 114. In another embodiment, group objects are not used, and instead the tokens, events and guards belonging to each group are displayed on a single display that shows that status of all the groups playing the game.

Figure 3A:
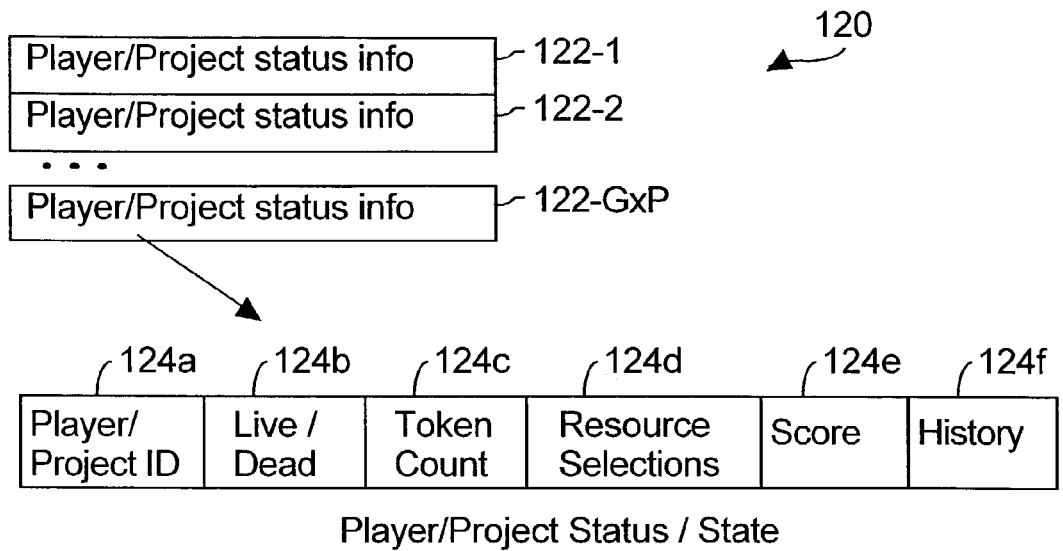
FIGS. 3A, 3B and 3C depict data structures representing the status of a player or project, the status of a group of players, and the status of a team comprising two or more groups of players, in accordance with an embodiment of the present invention.

FIG. 3A represents an array 120 of player/project status information, with a player/project status record 122 being provided or stored for each player of the game. The number of players (and hence the number of player/project status records) is preferably G×P, where G is the number of groups and P is the number of players per group. Each player/project status record 122 may store the following information:

an optional identifier 124a of the player or project (this field is not strictly needed, and may be omitted in other embodiments);

a live/dead indicator 124b, which indicates whether the project associated with the record 122 is alive or dead;

a token count 124c, used in the first phase of the game to indicate the number of tokens owned by the player or project associated with the record 122;

resource selections 124d, indicating the resources allocated to the project associated with the record, and for each allocated resource whether it has been designated as a required resource or a desirable resource;

score 124e, which is the score earned by the player or project associated with the record 122; and history 124f, which is a listing of all the actions taken by the player during the game.

Of the fields 124a–124f described above, only fields 124b, 124c and 124d of each player/project record 122 are needed to implement the game, while the other fields store useful but optional information.

Figure 3B:
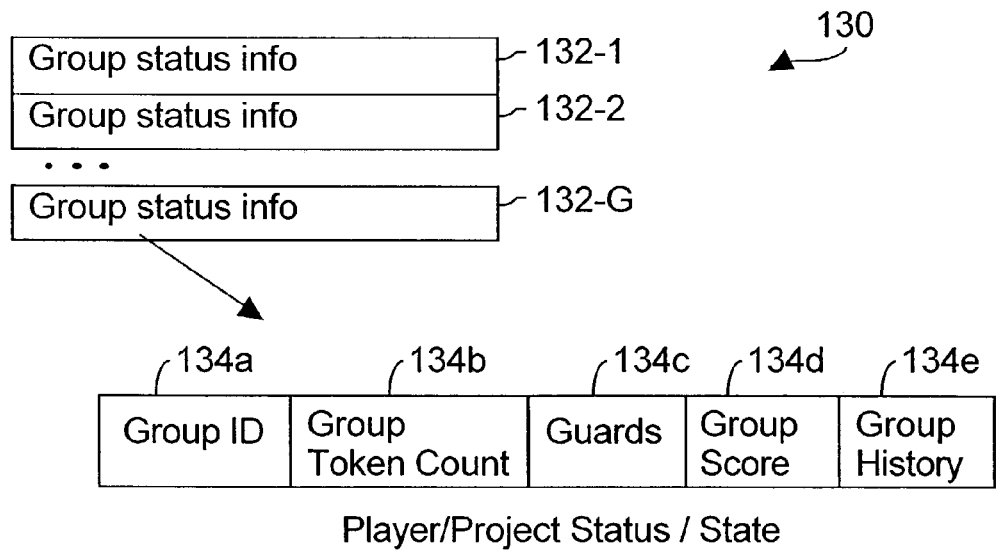

FIG. 3B represents an array 130 of group status information, with a group status record 132 being provided or stored for each group of players. The number of groups is denoted by the symbol G. Each group status record 132 may store the following information:

an optional identifier 134a of the group (this field is not strictly needed, and may be omitted in other embodiments);

a group token count 134b, used to keep track of the tokens owned by the group during certain phases of the game;

guards 134c, which are the guards selected by or otherwise currently owned by the group associated with the group record 132;

a group score 134d, which is the score earned by the group associated with the group record 132; and history 134e, which is a listing of all the actions taken by the group during the game.

Of the fields 134a–134e described above, only fields 134b and 134c of each group record 132 are needed to implement the game, while the other fields store useful but optional information.

Figure 3C:
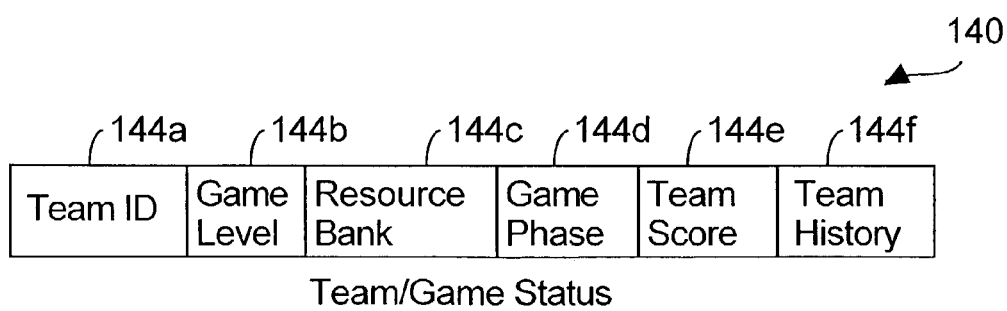

FIG. 3C represents a team status record 140, one of which is stored for the game. This record 140 may store the following information:

an optional team identifier 144a of the team (this field is not strictly needed, and may be omitted in other embodiments);

a game level indicator 144b, which indicates a level of game difficulty or level of expertise of the players;

a resource bank 144c field, used to indicate the number of each type of resource that is available to each of the groups of players;

game phase 144d, indicating the current phase of the game, and may also indicate the current sub-phase of the game for phases having sub-phases;

a team score 144e, which is the score earned by the team of players; and history 144f, which is a listing of all the actions taken by the team of players during the game.

Of the fields 144a–144f described above, only fields 144b through 144d are needed to implement the game, while the other fields store useful but optional information.

Game System

Figure 4:
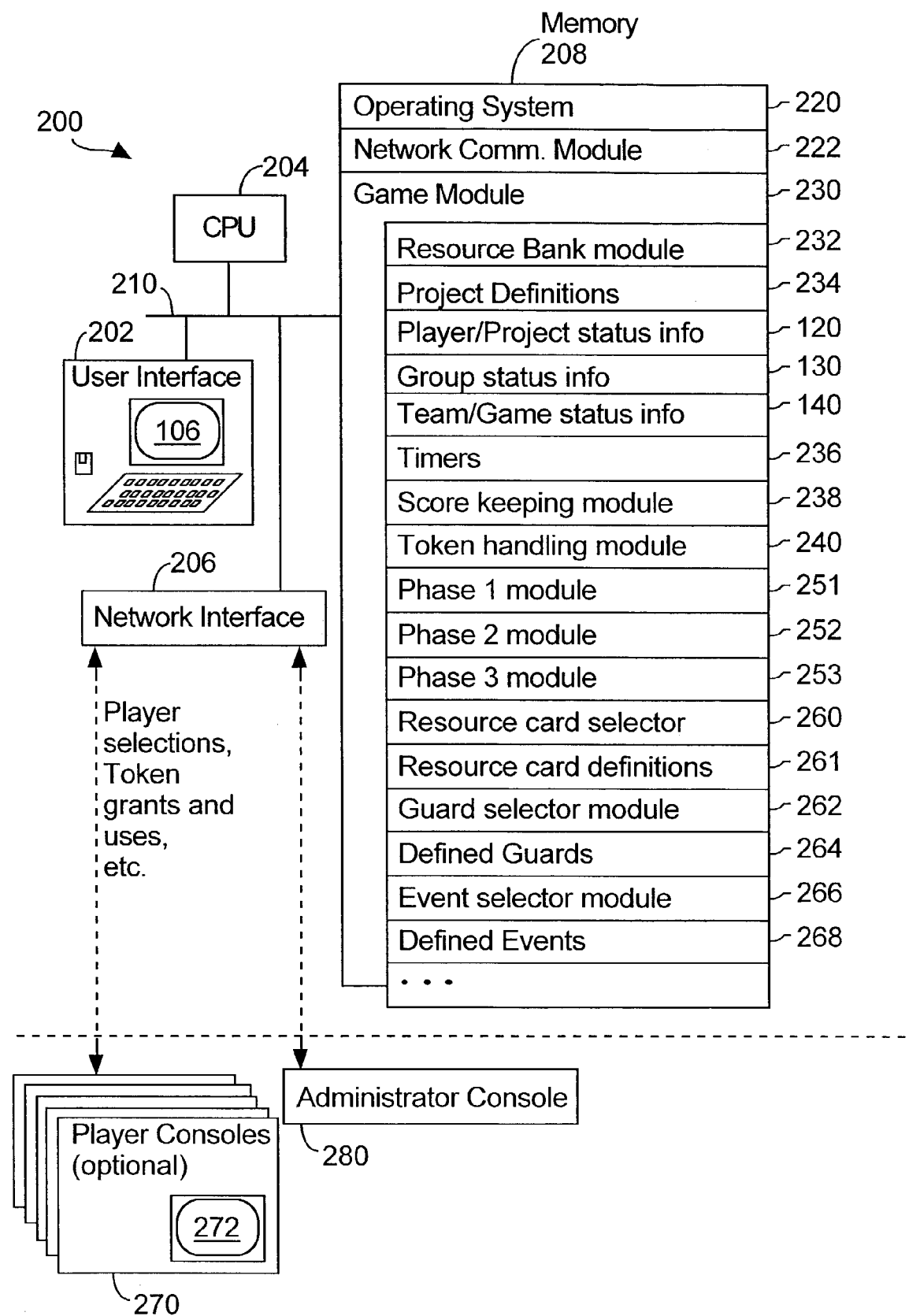
FIG. 4 is a block diagram of a computer system, used in a computerized embodiment of the present invention.

In a preferred embodiment, the game system is implemented using one or more computer systems 200, as schematically shown in FIG. 4. The computer system 200, sometimes herein called the game computer, will typically have a user interface 202 (including a display 106), one or more processing units (CPU's) 204, a network or other communications interface 206, memory 208, and one or more communication busses 210 for interconnecting these components. Memory 208 may include high speed random access memory and may also include non-volatile memory, such as one or more magnetic disk storage devices. Memory 208 may include mass storage that is remotely located from the central processing unit(s) 204. The memory 208 preferably stores:

an operating system 220 that includes procedures for handling various basic system services and for performing hardware dependent tasks;

a network communication module 222 that is used for connecting the system 200 to various client computers 270, 280 (e.g., client computers that function as project tablets or objects, and perhaps a client computer used by a facilitator or administrator supervising the playing of the game) and possibly to other servers or computers via one or more communication networks, such as a, the Internet, other wide area networks, local area networks (e.g., a local wireless network may connect the client computers 270, 280 to the game system 200), metropolitan area networks, and so on; and a game module 230, for implementing many aspects of the present invention.

The game module 230 may include executable procedures, sub-modules, tables and other data structures. In a preferred embodiment, the game module 130 includes:

a resource bank module 232, for determining the number of each type of resource to be provided in the resource bank for each group of players;

project definitions 234, which define the set of projects controlled by the players in each group;

player/project status information 120, as described above with reference to FIG. 3A;

group status information 130, as described above with reference to FIG. 3B;

team status information 140, as described above with reference to FIG. 3C;

timers 236, for tracking the passage of time, especially for time limited activities during the game; timers are is required only for embodiments of the game that utilize time limited activities, or that otherwise use time measurements as part of the game or game scoring mechanisms;

score keeping module 238, which computes scores for the individual players the groups, and the team;

token handling module 240, for implementing the various rules concerning token ownership, purchasing or saving resources with tokens, and so on;

a phase 1 module 251, for controlling a first phase of the game;

a phase 2 module 252, for controlling a second phase of the game;

a phase 3 module 253, for controlling a third phase of the game;

a resource card selector 260, for selecting one or more resources to be given to a group of players during the second phase of the game;

a table 261 of data structures representing resource cards 112, available for selection by the resource card selector 260; each resource card data structure specifies a resource and optionally specifies whether the resource is free or can be obtained only by trading it for another resource;

a guard selector module 262, for governing the selection and trading of guards;

defined guards 264, which are the definitions of all the guards available for selection by the groups of players;

event selector module 266, for selecting events to be used during the third phase of the game; and defined events 268, which are the definitions of all the events to which the groups may be subjected during the course of the game.

It will be appreciated that many of the details of the game in the embodiment described herein would differ in other embodiments.

DETAILS OF GAME EMBODIMENT

Figure 5A:
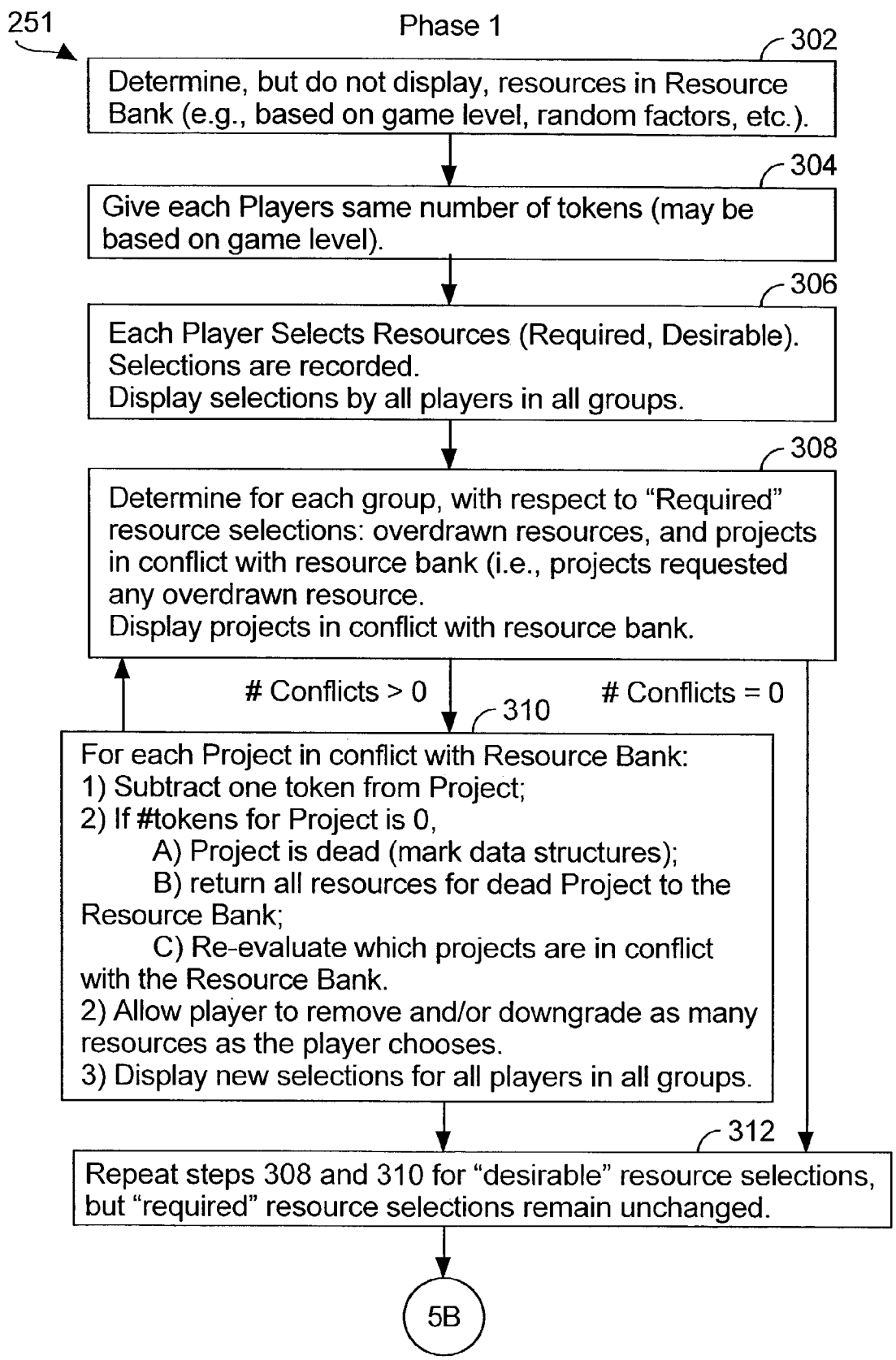
FIGS. 5A and 5B are a flow chart of a first game phase, as controlled by a first game phase module.
Figure 5B:
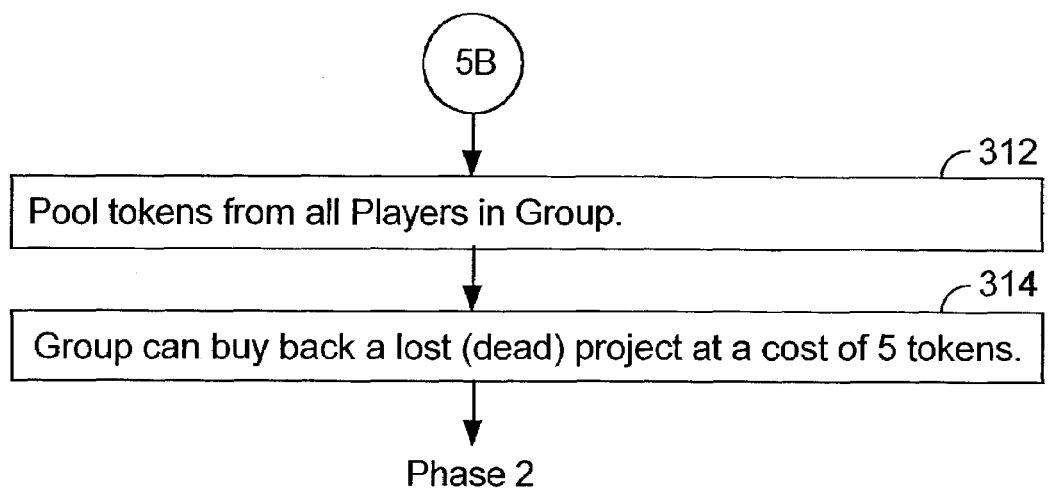
Figure 6:
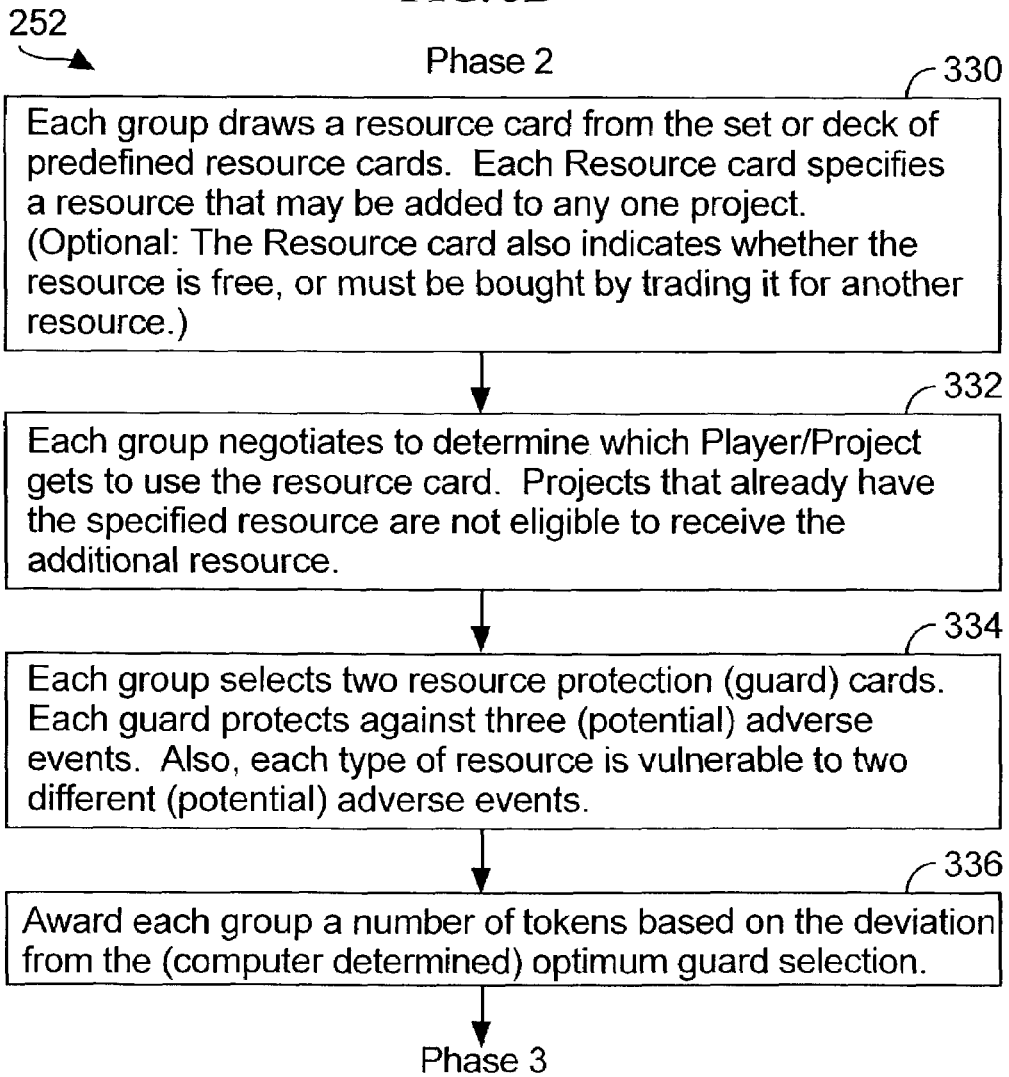
FIG. 6 is a flow chart of a second game phase, as controlled by a second game phase module.
Figure 11:
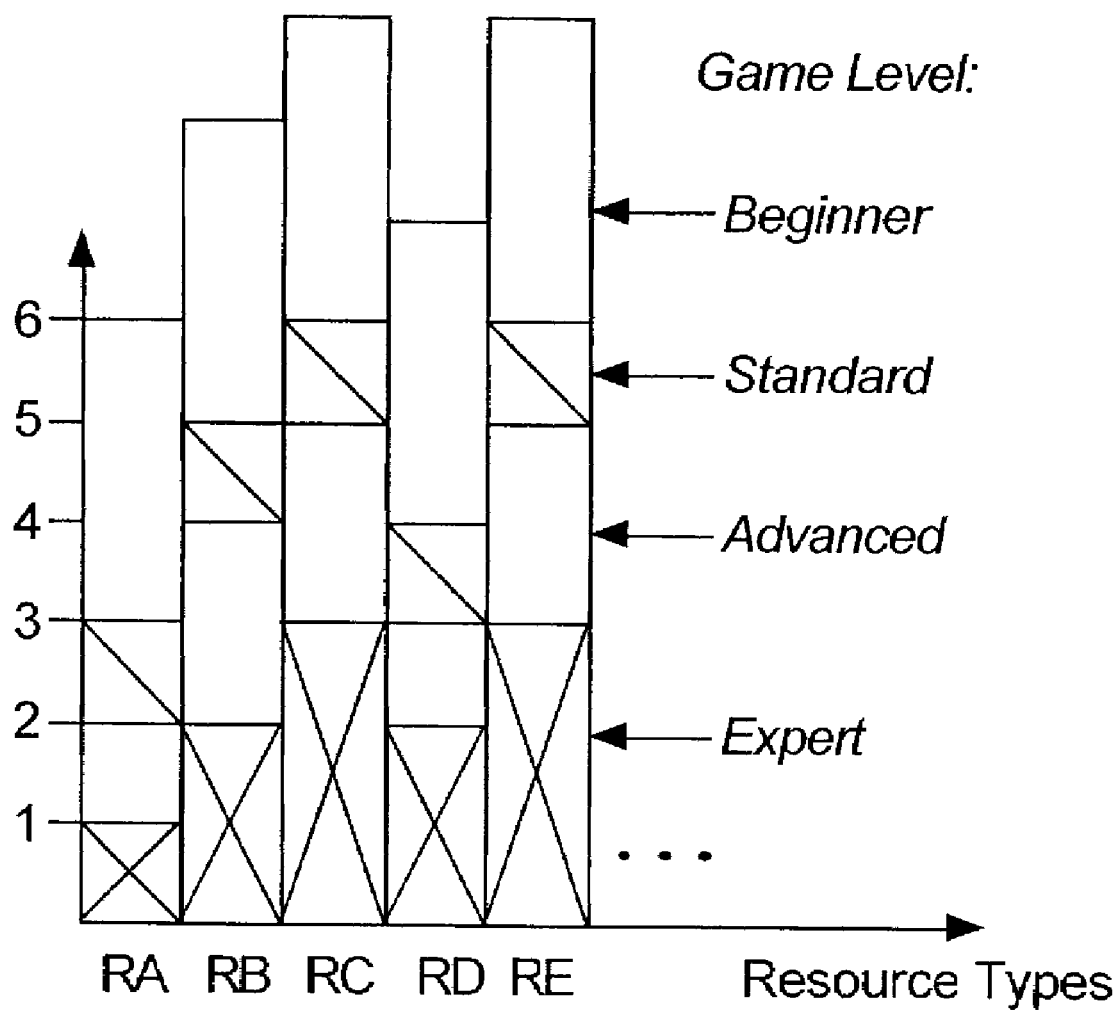
FIG. 11 depicts the amount of resources in the resource bank as a function of the game level.

In Phase 1 of the game, as shown in FIGS. 5A and 5B, the resources in the resource bank are determined (302), under the control of the phase 1 module 251 and the resource bank module 232. The number of each type of resource may be determined by a game level selected for the game, where the game level represents a level of difficulty or a level of expertise of the players. FIG. 11 shows an example of resource quantities determined by the game level. Preferably however, in order to make each game different (or at least different from most other iterations of the game), the number of resources in the resource bank is determined using a random or pseudo-random number generator, within predefined upper and lower limits. The upper and lower limits may be determined by the game level. The number of each type of resource in the resource bank is not revealed to the players. Rather, the players must infer the likely levels of resources in the resource bank based on the flow of the game.

Each player is given a same number of tokens (304). The number of tokens given to each player may be based on the game level, or may be a fixed number. In one embodiment, each player is initially given five tokens.

To start the game, each player is assigned a project. After having received a project each player chooses the resources he needs to construct his project (306). The player places each of the chosen resources on the "required" or the "desirable" side of his project card or display. The required resources symbolize the resources that the player finds absolutely necessary to complete his project—without them, the project becomes meaningless and should be abandoned. On the "desirable" side he places the resources that would be good to have but are not critical. It is up to the individual player to determine which resources are necessary for each project—there is no right or wrong answers to this player decision. As will be explained in more detail below, the needed resources are easier to acquire than the desirable resources, but they are also more expensive to maintain. This is an important fact, because later, if any of the required resources are hit by an event, the owner will loose the entire project if he can't convince his group to pay for their maintenance. An advantage of putting resources on the required sided of his project card is that these resources are negotiated separately and before the desirable (but not required) resources. In other words, the required resources are more likely to be granted before the desirable resources because they are distributed while the Resource Bank has its maximum content.

After each player has completed populating his project card with resources, the selections are recorded (306), for instance by the computer system 200 shown in FIG. 4, or on a piece of paper, or a whiteboard or the like. Table 1 lists the types of resources that are available for allocation to projects in one implementation of the game. The six projects assigned to the six players in each group are: Playground, Community Park, Nature Trail, Public Beach, Train Station, Commuter Stop. Of course, the set of projects and types of resources may be completely different in other embodiments.

The game computer preferably displays the resource selections of all players, in view of all players. It should be noted that each group plays against a separate (but equally well stocked) Resource Bank. This makes the information about other people's resource selections irrelevant in phase 1 of the game. The information is displayed for the sake of the players, in part so they can verify that their selections were recorded accurately, and in part so that they can compare their resource selections with the selections for the identical projects by the players in different groups. As stated above, the projects are repeated in each group. Furthermore, in a preferred embodiment, no two projects in a group are the same.

Next, the game computer determines for each group, but only with respect to "required resources" selected by the group members, which resources are overdrawn (308). In other words, for all the projects in each group, the total "required" resources are compared with the resources in the Resource Bank. Each resource type whose total is excess of the quantity available in the Resource Bank is considered to be an overdrawn resource. Each project that has a required resource that is among the overdrawn resources is determined to be in conflict with the Resource Bank and is so flagged in a display by the game computer (308). If none of the projects are in conflict with the Resource Bank with respect to required resources, step 310 is skipped and phase 1 of the game proceeds to step 312. Otherwise step 310 is executed.

In a preferred embodiment, during the first execution of step 308, if there are no overdrawn resources for a particular group, the Resource Bank is modified (e.g., automatically modified by the game computer), by reducing the quantity of at least one type of resource, so as to ensure that at least one of the resources is overdrawn. As a result of this change to the Resource bank, the stocking of the Resource Bank may be different for different groups. A reason for this special handling of the Resource Bank is that a lack of conflicts between projects would undermine one of the primary purposes of the game, which is to give the players practice in resolving conflicts over resource allocations.

In step 310, the players whose projects are in conflict with the Resource Bank are given the opportunity to reduce the required resources for their project so as to bring it out of conflict with the Resource Bank. Projects not in conflict with the Resource Bank do not participate in step 310. For each project in conflict with the Resource Bank, a token is subtracted, as a penalty for having selected too many resources. If the number of remaining tokens for the project is zero, the project is denoted as being dead, and all its resources are returned to the Resource Bank. As a result of the resource reductions by the players some of the projects may no longer be in conflict with the Resource Bank. However, before a project is declared dead, the players in the group are given the opportunity to donate one or more tokens to the project that has run out of tokens. Since the group looses points if they allow a project to die, they may be motivated to donate tokens to a project that would otherwise be declared to be dead. They may also demand control or partial control over the level of resource requests made for the project in return for donating tokens to it.

If the number of remaining tokens for a project is not zero, the player controlling the project can remove any number of required resources from his project card, and can downgrade any number of required resources to desirable resources. During phase one of the game, players can only reduce the number of resources requested by a project; no resources can be added to a project during this is initial phase. After all the players whose projects were in conflict with the Resource Bank have updated their selections in step 310, or have had their projects declared dead, the updated selections and project statuses are displayed (310). At this point the evaluation in step 308 is repeated, and if any projects are still in conflict with the Resource Bank, those projects are once again required to perform step 310. Steps 308 and 310 are repeated until no projects are in conflict with the resource bank.

In step 312, all the required resources allocated to the projects are subtracted from the Resource Bank, and then steps 308 and 310 are repeated, but with respect to the desirable resources allocated to the projects and with respect to the remaining resources in the Resource Bank. Once again it is noted that each group has its own copy of the Resource Bank, and so the decisions made in steps 308, 310 and 312 are made separately for each group of players and projects.

After step 312, none of the projects in each group are in conflict with the respective Resource Bank for that group. At this point, the tokens of the players in each group are pooled (314), and thereafter are the property of the respective groups. Also, at the end of phase 1, each group decides whether to buy back any dead projects, at a cost of a predefined number of tokens (e.g., five tokens) per project, thereby converting them into live projects (314). In one embodiment, when a dead project is revived, it resumes life with no resources allocated to it. However, resources can be allocated to the revived project during phase 2 of the game.

In Phase 2, each group draws a resource card (330), which gives the group the opportunity to replace or add a resource to one of their projects. When implemented as a board game, the resource card may be implemented as a cardboard or plastic or laminated card. A deck of resource cards is preferably shuffled prior to the beginning of the game so as to randomize the resource cards drawn by the groups during Phase 2 of the game. A record of the drawn resource card and the project to which it is allocated by the group (see step 332) is entered into the game computer.

When implemented as a computer game, the resource cards 112 may be implemented as a predefined set of data structures stored in a table 261 in the game computer 200 (FIG. 4). Each resource card data structure has a corresponding image that is displayed either on the server computer's display 106, the displays 272 of the player consoles 270 (FIG. 4) for the group of players which drew the resource card, or both. The resource cards are either randomly ordered at the beginning of the game, such as by generating a randomly ordered index of the resource card data structures, or a card from the set of resource cards (i.e., data structures) is selected using a random or pseudo-random methodology each time a resource card is drawn by a group. For instance, if there are N predefined resource cards, each having a corresponding data structure stored in a table 261 in the memory of the game computer 200, an integer random number R between 0 and N−1 may be generated using a random number generator, including random number generators now known or created in the future. The random number R identifies the selected or drawn resource card, which is then displayed to the players in the group that drew the card. The probabilities of drawing each type of resource card may be equal, or they may be weighted by including more copies of certain types of resource cards than other types of resource cards in the deck of resource cards, or by weighting their probabilities in the selection process performed by the game computer.

As noted above, each resource card data structure in the table 261 specifies a resource and optionally specifies whether the resource is free or can be obtained only by trading it for another resource. When a group draws a resource card (330) that specifies a resource available to the group (herein called the proffered resource) in trade for any other resource, the group can decline the proffered resource or it can specify a trade. The decision must be made by the group as a whole and then communicated to the game computer. If a trade is to be made, the trade is specified by specifying which resource is to be traded, including the project it is to be taken from, as well as the project to which the proffered resource is to be given. The proffered resource need not be given to the same project as the one from which the traded resource is taken. If the resource card specifies a proffered resource and does not require a trade, the group only decides which project is to receive the resource. In either case, the group is challenged to make a resource allocation that is the best for the group as a whole (332). Because no more than one instance of each resource can be allocated to any one project, projects that already have the proffered resource are not eligible to receive another resource of the same type. So the negotiations or discussions within the group will typically focus on the players who control the projects that could potentially received the proffered resource. In other embodiments, where more than one instance of at least some resources can be allocated to a project, the game rules are adjusted accordingly and the dynamics of the group's resource allocation decision making process will be somewhat different.

In some embodiments, each group receives more than one resource card, thereby requiring the group to make two or more new resource allocation decisions together as a group.

Next, each group selects two guard cards (334). Tables 2 and 3 identify and define the available guard cards, the resources they protect and the potential events against which they provide protection. In this embodiment each guard card protects against three potential adverse events. However, the number and type of adverse events that are protected by each guard card may vary from one embodiment to another. Also, in other embodiments the guard cards may be replaced by other mechanisms or game objects, and generally should represent something of future potential value to the group. In yet other embodiments, the number of guards selected by each group may be more or less than two. Before making its guard selections, the group should study the available guards, consider the resources (as especially the required resources) that have been allocated to the projects in the group, and should attempt to select the optimal guards, which are the guards most likely to protect the largest number of required resources.

Optionally, each group is awarded a number of tokens based on the deviation between the guard selections made by the group and a computer determined optimum set of guard selections. For instance, the number of tokens awarded may be determined by a formula of the type:

$$TokenAward = A \times \left(\frac{Coverage - B}{MaxCoverage}\right)$$

where A and B are control parameters, Coverage is a measurement of the protection afforded by the guards selected by the group, and MaxCoverage is a measurement of the protection that would have been afforded by the optimum set of guards that could have been selected by the group. The Coverage and MaxCoverage values may be determined, for instance, by assuming that every possible event occurs, and determining a token value for every resource protected against each event, and summing those token values to produce the Coverage or MaxCoverage value. For instance, when a required resource is protected against an event, it may be given a token value of 3, and when a desirable resource is protected against an event it may be given a token value of 2. In one embodiment, A is equal to 5 and B is equal to 2.

At the end of phase 2 of the game, each group has a number of tokens, a set of guards, and a set of projects having required and desired resources.

Figure 7:
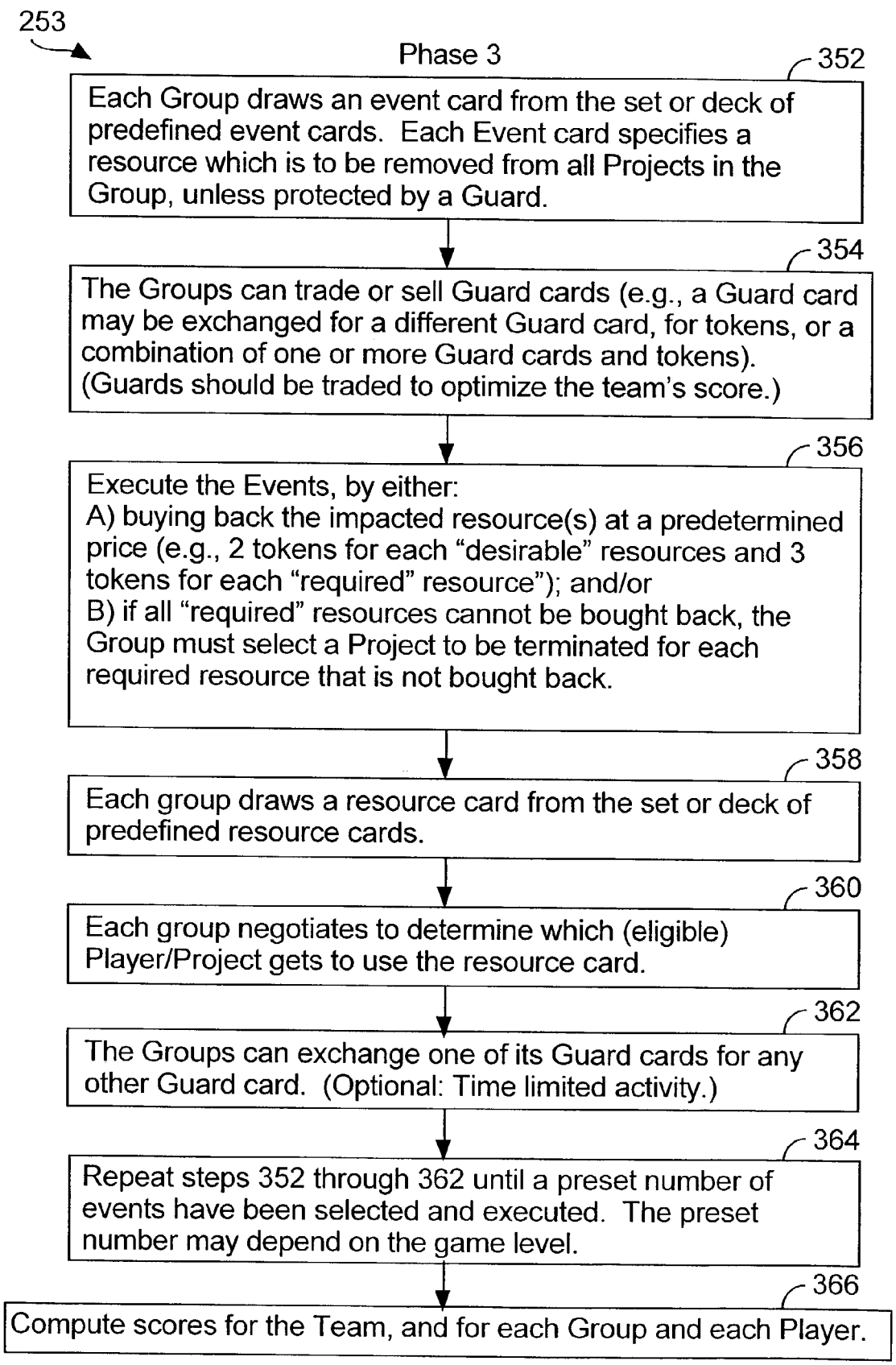
FIG. 7 is a flow chart of a third game phase, as controlled by a third game phase module.

Referring to FIG. 7, in phase 3 of the game the groups of players interact with each other as groups, and also the players within the groups interact in response to adverse events that threaten the resources allocated to the groups. In particular, each group draws an event card from the set or deck of predefined event cards (352). Each event card specifies a resource that is to be removed from all projects in the group which drew the card, unless protected by a guard owned by the group, or unless the group buys back the affected resources using the tokens owned by the group. As with the resource cards, event cards are either drawn from a physical deck of event cards, or are randomly or pseudo-randomly chosen by a procedure executed by the game computer. The probabilities of each type of event may be equal, or they may be weighted by including more copies of certain types of event cards than other types of event cards in the deck of event cards, or by weighting their probabilities in the selection process performed by the game computer.

Next, the groups are given the opportunity to trade guards (354). A guard owned by one group can be traded for a guard owned by another group. Three-way and multi-way swaps can be performed. Also, a guard can be traded in exchange for a guard plus a number of tokens, where the amount of tokens is negotiated between the groups performing the trade. The value of a guard (in units of tokens) may be determined, at least in part, based on the difference between the group score reduction that will be suffered in the event that a particular guard is not obtained in a trade and the group score reduction that will be suffered (if any) in the event that the guard is obtained in a trade. Generally, the groups should strive to trade guards so as to optimize the team's score.

After any guard trades, the events drawn by the groups are executed (356). Resources protected by guards are not impacted by events that affect only the protected resources. Event execution is accomplished by having the group impacted by an event buy back the impacted resources at a predetermined price (e.g., 3 tokens per required resource and 2 tokens per desired resource), to the extent that the group has sufficient tokens to make these purchases, and by terminating projects for which a required resource is not protected by a guard and cannot be bought back with tokens. The group must select the project or projects to be terminated when it has insufficient guards and tokens to project all its required resources. A group can also decide not to buy back a resource for a particular project, even though it has sufficient tokens, and to thereby terminate that project. In one embodiment, projects lost during this part of the game can be later revived by payment of the appropriate number of tokens. In another embodiment, projects lost during this part of the game are lost permanently.

Next, each group draws a resource card (358) either from a deck of resource cards or by using a computer controlled selection process. Then, as before, the players in each group negotiate to determine which eligible project controlled by its players receives the resource. Eligible projects are those that are alive, and that do not already have the proffered resource. In an alternate embodiment, each group draws two resource cards, or a fixed number of resource cards that is more than two, and then determines how to allocate the received resources.

Further, at this point of the game each group is allowed to exchange one of its guards for any other guard of its choosing (360). If trading of guards occurred in step 354, it is likely that at least one of the groups will want to exchange one of its guards for another. In one embodiment, the amount of time allowed for the groups to make guard exchanges is time limited, for instance to a period of five minutes. A timer of the game system is used to enforce the time limit, if any. In another embodiment, no time limit is imposed. Furthermore, in some embodiments, if the new guard selection by a group is closer to the optimal choice than the groups earlier choice, the group is given the additional token or tokens associated with that better choice (see step 336 of FIG. 2, and the corresponding explanation, above).

The phase 3 steps 352 through 362 are preferably repeated until the event card drawing and execution steps (352 through 356) have been executed a predefined number of times (364). The number of times that phase 3 is repeated may be determined by the game level, or may be a fixed number. Typically, at least three events should be drawn and executed in order to get a reasonable distribution of losses among the players. The number of events may be determined by the amount of time available for the game. A timing constraint can be imposed on the game as a whole, or timing constraints may be placed on one or more phases of the game to encourage the players to make decisions without undue delay.

Finally, at the conclusion of the game, individual, group and team scores are computed (366), as will be described in more detail next.

In an alternate embodiment, after step 364, but before the final scoring of the game in step 366, the players in each group are asked to identify or guess the winning player in their group. In other words, the players are asked to guess which player in the group has the highest individual score. The guesses by the players are entered into the game computer. Then, for each player who guesses incorrectly, the individual score of that player is reduced by a factor corresponding to the difference between the score of the winning player and the score of the player incorrectly identified by the player as the winner. For instance, the score reduction can be proportion to the score difference. In another example, the score reduction can be based on whether the difference is "small," "medium" or "large", based on predefined ranges. Examples of score reductions are 0, 1 and 3 for small, medium and large differences between the winning player's score and the score of the player misidentified as the winning player.

Scoring the Players, Groups and Team

Referring to FIGS. 8A and 8B, an individual score for each player, or his project, is computed using an individual score calculator, or an equivalent mathematical function or software module. A first aspect of the player's individual score is the difference between the resources the player initially designated as required resources and the required resources designated for the player's project at the end of the game. In particular, this difference is computed by subtracting the number of resource matches between the initial required resources and final required resources for the project from the number of resources in the initial required resources. This value is then mapped to a score. In the example shown in FIGS. 8A and 8B, a difference of zero, indicating a realistic and well selected initial set of required resources, earns a score of 10, a difference of one earns a score of 7, a difference of two earns a score of 3, and any other difference earns a score of 1. Thus, each player can improve his or her individual score by selecting an initial set of required resources that can be maintained, or almost maintained, through the entire game. Another factor in the individual player's score is the number of tokens remaining in the player's project at the end of phase 1 of the game. Furthermore, if the player's initial project proposal (i.e., the selection of required resources) is deemed by the game computer (or by an administrator of the game) to be unreasonable, a penalty value (e.g., −1) is included in the computation of the individual player's score. An example of an unreasonable initial project proposal would be one having no required resources, or one having all possible resources designated as required resources. These scoring factors are summed to generate each player's individual score.

As explained above, in an alternate embodiment an additional factor in determining each player's individual score is the accuracy with which the player is able to identify the winning player in the group. In particular, each player's score is reduced by a factor corresponding to the difference between the score of player they identified as the winner and the score of the actual winning player. Of course, if the winning player does a particularly bad job of guessing the winning player (i.e., identifying a player with a very bad score instead of identifying himself or herself), then this additional factor may change the identity of the winning player in the group. Nevertheless, for the purpose of assessing this score reduction, the "winning player" and the winning player's score is based on the results of the game prior to the step of guessing the winning player.

Referring to FIG. 9, a group score for each group of players, is computed using a group score calculator, or an equivalent mathematical function or software module. The exemplary group score calculator takes into account three factors: the number of tokens owned by the group at the end of the game, the number of live projects controlled by the group's players, and the total number of resources (including both required and desirable resources) used by the live project controlled by the group. Each of these factors is multiplied by a corresponding coefficient or multiplier to produce a weighted value (or product), and the weighted values are summed to produce a group score. FIG. 9 shows one possible set of coefficients for producing weighted values.

Referring to FIG. 10, a team score for all the players is computed using a team score calculator, or an equivalent mathematical function or software module. The exemplary team score calculator sums the group scores for all the groups participating in the game to produce a team score. The team score can be used to compare teams, or to compare a team's performance during one game with its performance in another game. In large organizations, teams with higher scores can be rewarded as the best working teams, setting an example for other teams. The game allows for identification of what qualities make a high scoring team, thereby enabling an organization to continuously improve its performance.

In order to control scenarios where a player refuses to cooperate (e.g., by refusing to eliminate or downgrade his resources), a score for cooperation can be included. This can be achieved by imposing a hidden "best mental mode" of the resource distribution, such as a library with reasonable project resource allocations. Projects initially populated outside this range may be considered game "sabotage" and a low (or negative) cooperating score may be recorded as a correction to the individual score. Since all moves by the players are tracked, there can also be a reward for downgrading or eliminating sought after resources.

In addition to the scores described above, the game computer may produce a score for each player A that takes into account the player's individual score $I_A$, the score $G_J$ of the group J in which the player participated, as well as the team score:

$$Score(A,J) = i \times I_A + g \times G_J + t \times T$$

where i, g and t are weighting coefficients.

As explained above, for novice players who have not previously played the game, a "warm up" version of the above described game is preferably played at first. In the "warm up" version, the quantity of each type of resource in the Resource Bank is displayed at the end of phase 1 of the game, after the players have made their initial resource selections. In addition, scoring and penalties are preferably not used in the warm up version of the game. Playing the warm up version of the game enables the players to better understand the role of the hidden Resource Bank, as well as other features of the game, prior to playing the normal version of the game.

ALTERNATE EMBODIMENTS

In an alternate embodiment, each project can be allocated multiple instances of each resource. In another alternate embodiment, a subset of the resources can have multiple instances allocated to any one project. These alternate embodiments provide a more complex game, and one that is more realistic in terms of the resource allocation tasks faced by managers and executives during the course of their everyday jobs. As a result, a number of the rules of the game are adjusted accordingly, and the scoring of the game is also adjusted to take this into account.

The present invention can be implemented as a computer program product that includes a computer program mechanism embedded in a computer readable storage medium. For instance, the computer program product could contain the program modules and data structures shown in FIGS. 3A–3C and 4. These program modules may be stored on a CDROM, magnetic disk storage product, or any other computer readable data or program storage product. The software modules in the computer program product may also be distributed electronically, via the Internet or otherwise, by transmission of a computer data signal (in which the software modules are embedded) on a carrier wave.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

TABLE 1

Exemplary Resources in Resource Bank

| Resource Name | Resource# |
| --- | --- |
| Playground | R1 |
| Vending | R2 |
| Fountain | R3 |
| Trees | R4 |
| Benches | R5 |
| Parking | R6 |

TABLE 1-continued

Exemplary Resources in Resource Bank

| Resource Name | Resource# |
|---|---|
| Pond | R7 |
| Restrooms | R8 |
| Lockers | R9 |

TABLE 2

Guards for Protection Against Adverse Events

| Guard ID # | Guard Name | Guard Resource Protection | Resource | Event |
|---|---|---|---|---|
| G1 | Doctor | Playground Equip | R1 | E1 |
| | | Vending | R2 | E2 |
| | | Fountain | R3 | E3 |
| G2 | Fire Hydrant | Trees | R4 | E4 |
| | | Benches | R5 | E5 |
| | | Parking | R6 | E6 |
| G3 | Exterminator | Pond | R7 | E7 |
| | | Restrooms | R8 | E8 |
| | | Lockers | R9 | E9 |
| G4 | Trash Can | Fountain | R3 | E10 |
| | | Playground Equip | R1 | E11 |
| | | Trees | R4 | E12 |
| G5 | Police | Parking | R6 | E13 |
| | | Lockers | R9 | E14 |
| | | Pond | R7 | E15 |
| G6 | Handy Man | Restrooms | R8 | E16 |
| | | Benches | R5 | E17 |
| | | Vending | R2 | E18 |

TABLE 3

Event Cards

| Event | Resource Lost | Explanation | Guard |
|---|---|---|---|
| E1 | Playground Equipment | Swing Accident | G1/Doctor |
| E2 | Vending Machine | Improper Usage resulting in personal injury | G1/Doctor |
| E3 | Drinking Fountain | Water Quality Problem | G1/Doctor |
| E4 | Trees | Wild Fire | G2/Fire Hydrant |
| E5 | Bench | Fire caused by repair man | G2/Fire Hydrant |
| E6 | Parking Log | Car Fire spreads to other cars in parking lot | G2/Fire Hydrant |
| E7 | Pond | Mosquito Breeding | G3/Exterminator |
| E8 | Restroom | Rat Sightings | G3/Exterminator |
| E9 | Lockers | Ant Infestation | G3/Exterminator |
| E10 | Fountain | Gum deposits clog fountain drains | G4/Trash Can |
| E11 | Playground Equipment | Trash buildup | G4/Trash Can |
| E12 | Trees | Fallen debris cause general hazard | G4/Trash Can |
| E13 | Parking | Drug trading in parking lot | G5/Police |
| E14 | Lockers | Repeated thefts | G5/Police |
| E15 | Pond | Illegal wildlife hunting | G5/Police |
| E16 | Restrooms | Water leak | G6/Handy Man |
| E17 | Benches | Aging/rotting | G6/Handy Man |
| E18 | Vending | Misuse, e.g., jam by foreign coin | G6/Handy Man |

What is claimed is:

1. A multiple player game, for teaching negotiation skills comprising:
   a plurality of game objects utilized by a plurality of players of the game, the game objects including project objects corresponding to projects to which resources are allocated by the players, each project object being controlled by a respective player of the plurality of players; wherein the players are separated into a plurality of groups, each player being assigned to a respective group of the plurality of groups;
   a resource bank mechanism for determining a bank of resources to be made available to each said group of players for allocation to the projects controlled by the players in each said group of players;
   a plurality of game mechanisms, governing a plurality of game phases in which players compete and cooperate with each other so as to allocate resources from the bank of resources to the projects controlled by the respective players, including a first game mechanism allowing each respective player to make individual game play choices with respect to allocation of resources to the project controlled by that player, a second game mechanism requiring each group of the players to make joint decisions regarding allocation of resources to the projects in the group, and a third game mechanism requiring a plurality of the groups to make team level decisions affecting the allocation of resources to the projects within the plurality of groups; and
   a scoring mechanism for assigning a respective project score to each project of each group, a group score to each group of projects, and a team score to the plurality of projects, so as to teach the negotiation skills.

2. The game of claim 1, wherein the players in each group control an identical set of projects.

3. The game of claim 1, wherein the first game mechanism enables the players in each group to make initial resource allocations to the projects controlled by those players without regard to the resources available in the bank of resources.

4. The game of claim 3, wherein the second game mechanism is configured to require the players in each group to reduce the initial resource allocations so that the resource allocations by all the players in the group do not exceed the bank of resources available to the group.

5. The game of claim 3, wherein the second game mechanism is configured to require the players in each group to jointly allocate an additional resource to a project among the projects controlled by the players in the group.

6. The game of claim 3, wherein the second game mechanism is configured to require the players in each group to jointly allocate a plurality of resources to projects among the projects controlled by the players in the group.

7. The game of claim 1, wherein the third game mechanism is configured to enable the plurality of groups to make trades between the groups.

8. The game of claim 1, wherein the plurality of game mechanisms includes a mechanism for enabling each group to jointly select and possess a guard mechanism, from a set of predefined guard mechanisms, for protecting against adverse events a subset of the resources allocated to the projects controlled by the players in the group.

9. The game of claim 8, wherein the plurality of game mechanisms includes an event mechanism for selecting with respect to each group a respective event, from a set of predefined events, the selected event having an adverse impact on a particular resource of the bank of resources unless the group possesses a guard mechanism that projects against the selected event.

10. The game of claim 1, wherein the plurality of game mechanisms includes a plurality of mechanisms for enabling each group to make joint decisions, in anticipation of game events that have not yet occurred, so as to attempt to maximize the group score of the group.

11. The game of claim 10, wherein the plurality of game mechanisms includes a plurality of mechanisms for enabling each group to make joint decisions, in response to game events, so as to attempt to maximize the group score of the group.

12. The game of claim 1, wherein the plurality of game mechanisms includes a plurality of mechanisms for enabling each group to make joint decisions, in response to game events, so as to attempt to maximize the group score of the group.

13. A computer implemented method for enabling a plurality of players to play a game, for teaching negotiation skills comprising:
    providing a plurality of game objects utilized by a plurality of players of the game, the game objects including project objects corresponding to projects which resources are allocated by the players, each project object being controlled by a respective player of the plurality of players; wherein the players are separated into a plurality of groups, each player being assigned to a respective group of the plurality of groups;
    determining a bank of resources to be made available to each said group of players for allocation to the projects controlled by the players in each said group of players;
    using a plurality of computer implemented game mechanisms, governing a plurality of game phases in which players compete and cooperate with each other so as to allocate resources from the bank of resources to the projects controlled by the respective players, including a first game mechanism allowing each respective player to make individual game play choices with respect to allocation of resources to the project controlled by that player, a second game mechanism requiring each group of the players to make joint decisions regarding allocation of resources to the projects in the group, and a third game mechanism requiring a plurality of the groups to make team level decisions affecting the allocation of resources to the projects, so as to teach the negotiation skills within the plurality of groups; and
    assigning a respective project score to each project of each group, a group score to each group of projects, and a team score to the plurality of projects.

14. The method of claim 13, wherein the players in each group control an identical set of projects.

15. The method of claim 13, wherein the first game mechanism enables the players in each group to make initial resource allocations to the projects controlled by those players without regard to the resources available in the bank of resources.

16. The game of claim 15, wherein the second game mechanism is configured to require the players in each group to reduce the initial resource allocations so that the resource allocations by all the players in the group do not exceed the bank of resources available to the group.

17. The game of claim 16, wherein the second game mechanism is configured to require the players in each group to jointly allocate an additional resource to a project among the projects controlled by the players in the group.

18. The game of claim 15, wherein the second game mechanism is configured to require the players in each group to jointly allocate an additional resource to a project among the projects controlled by the players in the group.

19. The game of claim 15, wherein the second game mechanism is configured to require the players in each group to jointly allocate a plurality of resources to projects among the projects controlled by the players in the group.

20. The method of claim 13, wherein the third game mechanism is configured to enable the plurality of groups to make trades between the groups.

21. The method of claim 13, wherein the plurality of game mechanisms includes a mechanism for enabling each group to jointly select and possess a guard mechanism, from a set of predefined guard mechanisms, for protecting against adverse events a subset of the resources allocated to the projects controlled by the players in the group.

22. The game of claim 21, wherein the plurality of game mechanisms includes an event mechanism for selecting with respect to each group a respective event, from a set of predefined events, the selected event having an adverse impact on a particular resource of the bank of resources unless the group possesses a guard mechanism that projects against the selected event.

23. The method of claim 13, wherein the plurality of game mechanisms includes a plurality of mechanisms for enabling each group to make joint decisions, in anticipation of game events that have not yet occurred, so as to attempt to maximize the group score of the group.

24. The method of claim 13, wherein the plurality of game mechanisms includes a plurality of mechanisms for enabling each group to make joint decisions, in response to game events, so as to attempt to maximize the group score of the group.

* * * * *